United States Patent
Liu et al.

(10) Patent No.: US 9,178,284 B2
(45) Date of Patent: Nov. 3, 2015

(54) ELECTROMAGNETICALLY TRANSPARENT METAMATERIAL

(75) Inventors: Ruopeng Liu, Guangdong (CN); Zhen Liao, Guangdong (CN); Lin Luan, Guangdong (CN); Zhiya Zhao, Guangdong (CN)

(73) Assignees: KUSNG-CHI INNOVATIVE TECHNOLOGY LTD., FuTian District, Shenzhen, Guangdong (CN); KUANG-CHI INSTITUTE OF ADVANCED TECHNOLOGY, High-Tech Industrial Estate, Nanshan District, Shenzhen, Guangdong (CN)

( * ) Notice: Subject to any disclaimer, the term of this patent is extended or adjusted under 35 U.S.C. 154(b) by 604 days.

(21) Appl. No.: 13/522,954

(22) PCT Filed: Nov. 16, 2011

(86) PCT No.: PCT/CN2011/082260
§ 371 (c)(1),
(2), (4) Date: Jul. 18, 2012

(87) PCT Pub. No.: WO2012/122814
PCT Pub. Date: Sep. 20, 2012

(65) Prior Publication Data
US 2013/0049887 A1    Feb. 28, 2013

(30) Foreign Application Priority Data

Mar. 15, 2011  (CN) .......................... 2011 1 0061851
Mar. 15, 2011  (CN) .......................... 2011 1 0061874

(51) Int. Cl.
H01Q 15/02    (2006.01)
H01Q 15/00    (2006.01)
G02B 1/00     (2006.01)

(52) U.S. Cl.
CPC ............ *H01Q 15/0086* (2013.01); *G02B 1/002* (2013.01); *H01Q 15/006* (2013.01)

(58) Field of Classification Search
USPC .................................. 343/909, 911, 700 MS
See application file for complete search history.

(56) References Cited

U.S. PATENT DOCUMENTS

| | | | |
|---|---|---|---|
| 7,522,124 B2* | 4/2009 | Smith et al. ................... | 343/909 |
| 7,570,432 B1* | 8/2009 | Yonak ............................ | 359/652 |
| 2005/0146402 A1* | 7/2005 | Sarabandi et al. ............ | 333/219 |

(Continued)

OTHER PUBLICATIONS

Yifu Wang et al., "Creating a simplified, frequency-tunable metamaterial", SPIE Newsroom, Feb. 28, 2011, pp. 1/2-2/2, XP055128453.

(Continued)

*Primary Examiner* — Sue A Purvis
*Assistant Examiner* — Jae Kim
(74) *Attorney, Agent, or Firm* — Winston Hsu; Scott Margo

(57) ABSTRACT

The present disclosure relates to an electromagnetically transparent metamaterial, which comprises a substrate and a plurality of man-made metal microstructures arranged periodically inside the substrate. When an electromagnetic wave propagates through the metamaterial, each of the man-made metal microstructures is equivalent to two identical two-dimensional (2D) circuits, which are placed respectively in a direction perpendicular to an incident direction of the electromagnetic wave and in a direction parallel to the incident direction of the electromagnetic wave, and each of which comprises an inductor branch and two identical capacitor branches that are symmetrically connected in parallel with the inductor branch. The 2D circuits are associated with a waveband of the electromagnetic wave so that both a dielectric constant and a magnetic permeability of the metamaterial are substantially 1 when the electromagnetic wave propagates through the metamaterial.

10 Claims, 4 Drawing Sheets

(56) References Cited

U.S. PATENT DOCUMENTS

2008/0087973 A1 4/2008 Wang
2010/0220035 A1 9/2010 Lee

OTHER PUBLICATIONS

TH. Koschny et al., "Isotropic three-dimensional left-handed metamaterials", Physical Review B 71, Mar. 21, 2005, pp. 121103-1-121103-4, XP055128267, The American Physical Society.

Christoph Menzel et al., "High symmetry versus optical isotropy of a negative-index metamaterial", Physical Review B 81, May 25, 2010, pp. 195123-1-195123-6, XP055128254, The American Physical Society.

Wujiong Sun et al., "A transparent metamaterial to manipulate electromagnetic wave polarizations", Optics Letters, Mar. 15, 2011, pp. 927-929, vol. 36, No. 6, XP001561105, Optical Society of America.

* cited by examiner

ELECTROMAGNETICALLY TRANSPARENT METAMATERIAL

FIELD OF THE INVENTION

The present disclosure generally relates to a metamaterial, and more particularly, to an electromagnetically transparent metamaterial.

BACKGROUND OF THE INVENTION

The electromagnetically transparent material refers to a material that allows an electromagnetic wave to transmit therethrough and hardly changes the properties (including energy) of the electromagnetic wave. The electromagnetically transparent material is widely applied to the fields of aviation, aerospace, military equipment, radio equipment and so on, and functions to satisfy the performance requirements such as reception, transmission, amplification, mixing and radiation of microwave/millimeter-wave signals or to prevent the incident electromagnetic wave from being massively reflected so as to evade the rival's radar detection. The conventional electromagnetically transparent material is a fiber-reinforced resin-based composite material whose transparent property is related with the kind of fibers, the resin matrix, and interfacial properties of the composite material; and the influences of the fibers and the resin matrix on the transparent property of the material depend on the dielectric properties of the fibers and the resin matrix. Because the transparent property of such a conventional electromagnetically transparent material depends on the transparent property of the material itself, both the physical property and the transparent property of the conventional electromagnetically transparent material are not suitable for severe external environments (e.g., at a high temperature or under a high pressure). As a result, the conventional electromagnetically transparent material has a narrow application scope. Moreover, it is complex to adjust electromagnetic parameters of the conventional electromagnetically transparent material because compositions and components of the conventional electromagnetically transparent material must be adjusted with respect to different wavebands of the electromagnetic wave respectively. Consequently, a great amount of experimental verifications is required and the manufacturing cost is high.

SUMMARY OF THE INVENTION

In view of the aforesaid shortcomings of prior art, an objective of the present disclosure is to, on the basis of metamaterial design technologies, provide an electromagnetically transparent metamaterial having a simple structure and a wide application scope.

To achieve the aforesaid objective, the present disclosure provides an electromagnetically transparent metamaterial, which comprises a substrate and a plurality of man-made metal microstructures arranged periodically inside the substrate. When an electromagnetic wave propagates through the metamaterial, each of the man-made metal microstructures is equivalent to two identical two-dimensional (2D) circuits, which are placed respectively in a direction perpendicular to an incident direction of the electromagnetic wave and in a direction parallel to the incident direction of the electromagnetic wave, and each of which comprises an inductor branch and two identical capacitor branches that are symmetrically connected in parallel with the inductor branch. The 2D circuits are associated with a waveband of the electromagnetic wave so that both a dielectric constant and a magnetic permeability of the metamaterial are substantially 1 when the electromagnetic wave propagates through the metamaterial.

Preferably, each of the man-made metal microstructures comprises: a first metal branch, a second metal branch, and a third metal branch intersecting with one another at a common midpoint, with the first metal branch being parallel with the incident direction of the electromagnetic wave; two fourth metal branches and two fifth metal branches, which have midpoints located at two ends of the first metal branch respectively and which have the same length as and are parallel with the second metal branch and the third metal branch respectively; two sixth metal branches, which have midpoints located at two ends of the second metal branch respectively and which have the same length as and are parallel with the first metal branch; and two seventh metal branches, which have midpoints located at two ends of the third metal branch respectively and which have the same length as and are parallel with the first metal branch. The sixth metal branches and the fourth metal branches are positioned on a first plane of the man-made metal microstructure, the fifth metal branches and the seventh metal branches are positioned on a second plane of the man-made metal microstructure, and each of the fourth metal branches and each of the fifth metal branches have at least one pair of notch structures disposed symmetrically with respect to their respective midpoints.

Preferably, each of the notch structures is formed by a break in each of the fourth metal branches or in each of the fifth metal branches.

Preferably, two opposite eighth metal branches are further connected at two ends of the break respectively.

Preferably, the two opposite eighth metal branches are linear metal branches or arc-shaped metal branches.

Preferably, the first metal branch, the second metal branch and the third metal branch perpendicularly intersect with one another at the common midpoint and have the same length.

Preferably, the substrate is formed by a plurality of sheet membrances assembled together, each of the sheet membrances has a plurality of metal branches attached thereon; and the plurality of metal branches attached on the plurality of sheet membrances combine into the man-made metal microstructures after the plurality of sheet membrances are assembled together.

Preferably, the substrate is made of one or more of glass, FR-4, F4B, epoxy resin, polyethylene, polypropylene, rubber and PPE.

Preferably, the man-made metal microstructure is attached on the substrate through etching, electroplating, drilling, photolithography, electron etching, or ion etching.

To achieve the aforesaid objective, the present disclosure further provides an electromagnetically transparent metamaterial, which comprises a substrate and a plurality of man-made metal microstructures arranged periodically inside the substrate. When an electromagnetic wave propagates through the metamaterial, each of the man-made metal microstructures is equivalent to a three-dimensional (3D) circuit formed by three identical 2D circuits that are perpendicular to one another at a common midpoint. Each of the 2D circuits comprises an inductor branch and two identical capacitor branches that are symmetrically connected in parallel with the inductor branch. The three inductor branches having a common intersection point and perpendicular to one another form three axes of the 3D circuit. The 3D circuit is associated with a waveband of the electromagnetic wave so that both a dielectric constant and a magnetic permeability of the metamaterial are substantially 1 when the electromagnetic wave propagates through the metamaterial.

Preferably, each of the man-made metal microstructures comprises: a first metal branch, a second metal branch and a third metal branch intersecting with one another at a common midpoint; two fourth metal branches, which have midpoints located at two ends of the second metal branch respectively and which have the same length as and are parallel with the first metal branch; two fifth metal branches, which have midpoints located at two ends of the third metal branch respectively and which have the same length as and are parallel with the first metal branch; two sixth metal branches, which have midpoints located at two ends of the first metal branch respectively and which have the same length as and are parallel with the second metal branch; two seventh metal branches, which have midpoints located at the two ends of the third metal branch respectively and which have the same length as and are parallel with the second metal branch; two eighth metal branches, which have midpoints located at the two ends of the second metal branch respectively and which have the same length as and are parallel with the third metal branch; and two ninth metal branches, which have midpoints located at the two ends of the first metal branch respectively and which have the same length as and are parallel with the third metal branch. The two seventh metal branches and the two eighth metal branches are positioned on a first plane of the man-made metal microstructure, the two fifth metal branches and the two ninth metal branches are positioned on a second plane of the man-made metal microstructure, and the two fourth metal branches and the two sixth metal branches are positioned on a third plane of the man-made metal microstructure. Each of the seventh metal branches and each of the eighth metal branches have at least one pair of first notch structures disposed symmetrically with respect to their respective midpoints or each of the seventh metal branches and each of the eighth metal branches are formed with the first notch structure at their respective midpoints; and each of the fourth metal branches and each of the fifth metal branches have at least one pair of second notch structures disposed symmetrically with respect to their respective midpoints or each of the fourth metal branches and each of the fifth metal branches are formed with the second notch structure at their respective midpoints.

Preferably, each of the first notch structures is formed by interruptions between ends of each of the seventh metal branches and of each of the eighth metal branches.

Preferably, at both ends of each of the seventh metal branches and of each of the eighth metal branches, eleventh metal branches that extend towards the inside of the substrate and form a same angle respect to the corresponding seventh metal branch and eighth metal branch are disposed.

Preferably, each of the second notch structures is formed by a break at the midpoint of each of the fourth metal branches or of each of the fifth metal branches.

Preferably, two opposite tenth metal branches are further connected at two ends of the break respectively.

Preferably, the tenth metal branches and the eleventh metal branches are linear metal branches or arc-shaped metal branches.

Preferably, the first metal branch, the second metal branch and the third metal branch perpendicularly intersect with one another at the common midpoint and have a same length.

Preferably, the substrate is made of one or more of glass, FR-4, F4B, epoxy resin, polyethylene, polypropylene, rubber and PPE.

Preferably, the man-made metal microstructure is attached on the substrate through etching, electroplating, drilling, photolithography, electron etching, or ion etching.

The aforesaid technical solutions at least have the following benefits: by designing man-made metal microstructures of a metamaterial and periodically arranging the man-made metal microstructures inside a substrate so that the metamaterial has a predetermined electromagnetic response, the traveling path of an electromagnetic wave will not be deflected and the traveling direction of the electromagnetic wave will not be changed when the electromagnetic wave propagates through the metamaterial. By using the wave-transparent principle different from that of the conventional electromagnetically transparent material in the present disclosure, the electromagnetic wave transparent property is not limited by the material of the substrate, so the application scope of the electromagnetically transparent material is greatly enlarged. Further, the man-made metal microstructures of the present disclosure are designed to be symmetrical in each direction so that the man-made metal microstructures are isotropic (i.e., components of the dielectric constant and the magnetic permeability of the metamaterial at each point in the space remains unchanged in each direction), and this further enlarges the application scope of the present disclosure. Further again, because electromagnetic parameters of the electromagnetically transparent metamaterial of the present disclosure can be adjusted simply by adjusting the sizes of the man-made metal microstructures, the present disclosure advantageously has a low manufacturing cost and allows for convenient adjustment of the electromagnetic parameters.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

Light is a kind of electromagnetic wave. Because the wavelength of the light is much greater than the size of an atom of glass, a response of the glass to the light when the light propagates through the glass may be described by the overall parameters such as a refractive index of glass rather than the detailed parameters of atoms constituting the glass. Correspondingly, when researches are made on responses of a material to other electromagnetic waves, the responses of structures in the material, of which any dimension is much smaller than wavelengths of the electromagnetic waves, to the electromagnetic waves may also be described by the overall parameters such as a dielectric constant c and a magnetic permeability μ of the material. By designing a structure of the material at each point in such a way that both the dielectric constants and the magnetic permeabilities of the material at the individual points are the same as one another or different from one another, the dielectric constants and the magnetic permeabilities of the whole material can be regularly arranged so that the material macroscopically responds to an electromagnetic wave (e.g., converge or diverge the electromagnetic wave). Such a material whose magnetic permeabilities and dielectric constants are artificially arranged to be regular are called a metamaterial.

Figure 3:
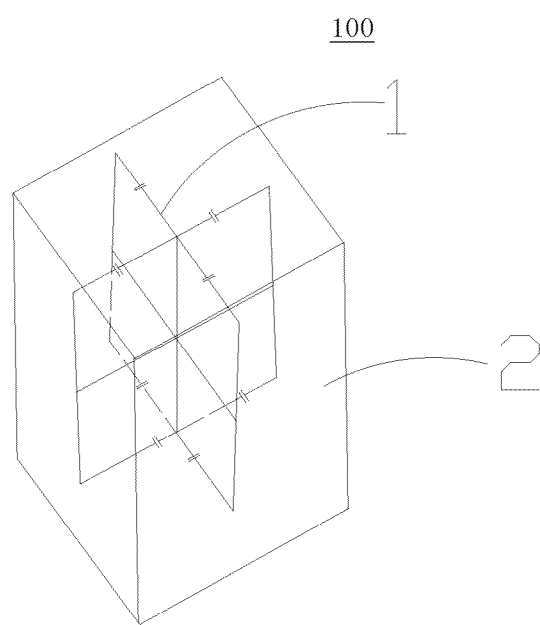
FIG. 3 is a schematic view illustrating a 3D structure of one of basic units constituting the electromagnetically transparent metamaterial of the present disclosure.

As shown in FIG. 3, there is shown a schematic view illustrating a three-dimensional (3D) structure of one of basic units constituting a metamaterial in the present disclosure. The basic unit of the metamaterial comprises a man-made microstructure 1 and a structural unit 2 receiving the man-made microstructure. In the present disclosure, the man-made microstructure is a man-made metal microstructure, which has a planar or 3D topology capable of responding to an electric field and/or a magnetic field of an incident electromagnetic wave; and the response of each basic unit of the metamaterial to the incident electromagnetic wave can be changed by changing the pattern and/or dimensions of the man-made metal microstructure on each basic unit of the metamaterial. By regularly arranging a plurality of basic units of the metamaterial, the metamaterial can be made to macroscopically respond to the electromagnetic wave. Because the metamaterial as a whole must make a macroscopic electromagnetic response to the incident electromagnetic wave, responses of the individual basic units of the metamaterial to the incident electromagnetic wave must form a continuous response, and this requires that the size of each of the basic units of the metamaterial shall be one tenth to one fifth of wavelength of the incident electromagnetic wave and preferably be one tenth of wavelength of the incident electromagnetic wave. Here, we intentionally divide the whole metamaterial into a plurality of basic units; however, it shall be appreciated that, this division is only for purpose of convenience in description but shall not be viewed as that the metamaterial is formed by a plurality of basic units pieced or assembled together. In practical applications, the metamaterial can be formed by periodically arranging man-made metal microstructures on a substrate, and this features a simple process and a low cost. "Periodically arranging" refers to that the man-made metal microstructures on the aforesaid basic units of the metamaterial divided are capable of making a continuous electromagnetic response to the incident electromagnetic wave.

On the basis of the aforesaid principle of the metamaterial, the present disclosure designs a metamaterial that exhibits a transparent property to an electromagnetic wave within a predetermined waveband. The so-called "transparent property" means that: both a dielectric constant and a magnetic permeability of the metamaterial are substantially 1 (i.e., a refractive index is substantially 1) when the electromagnetic wave of the predetermined waveband propagates through the metamaterial, so the traveling path of the electromagnetic wave will not be deflected and the traveling direction of the electromagnetic wave will not be changed after the electromagnetic wave of the predetermined waveband propagates through the metamaterial. "Both a dielectric constant and a magnetic permeability of the metamaterial of the present disclosure are substantially 1" means that a variation range of ±10% is acceptable for the dielectric constant and the magnetic permeability.

The design idea of the present disclosure is as follows. A kind of man-made metal microstructures are designed and periodically arranged inside a substrate. When an electromagnetic wave propagates through the metamaterial, each of the man-made metal microstructures is equivalent to two identical two-dimensional (2D) circuits, which are placed respectively in a direction perpendicular to an incident direction of the electromagnetic wave and in a direction parallel to the incident direction of the electromagnetic wave, and each of which comprises an inductor branch and two identical capacitor branches that are symmetrically connected in parallel with the inductor branch. Alternatively, when an electromagnetic wave propagates through the metamaterial, each of the man-made metal microstructures is equivalent to a 3D circuit formed by three identical 2D circuits that are perpendicular to one another. Moreover, the 2D circuits or the 3D circuit are associated with a waveband of the electromagnetic wave so that both a dielectric constant and a magnetic permeability of the metamaterial are substantially 1 when the electromagnetic wave propagates through the metamaterial.

In the following embodiments, the case where the 2D circuits are formed and the case where the 3D circuit is formed will be further detailed.

Hereinbelow, the design process of the present disclosure will be firstly discussed in detail. A waveband of an electromagnetic wave is predetermined according to actual requirements, and the metamaterial shall exhibit the transparent property when the electromagnetic wave of this waveband propagates through the metamaterial. Then, initial man-made metal microstructures are designed, and dimensions of and spacings among metal branches of each of the initial man-made metal microstructures are determined. When the electromagnetic wave of this waveband propagates through the initial man-made metal microstructure, the metal branches of different sizes and the spacings among the metal branches are just equivalent to equivalent inductive elements and equivalent capacitive elements in the equivalent 2D circuits according to the design principle of the present disclosure. The equivalent inductive elements and the equivalent capacitive elements make the whole initial man-made metal microstructure equivalent to an LC resonant circuit having a resonant waveband. The resonant waveband of the LC resonant circuit shall be adjusted to deviate from the desired waveband of the electromagnetic wave so that both the relative dielectric constant and the relative magnetic permeability are substantially 1. In this way, the design requirements of the present disclosure are satisfied, and the resonant waveband can be derived from the formula $\omega_0 = 1/\sqrt{LC}$. Because the node circuit theories no longer apply to the high-frequency microwave circuit design, the circuit has to be analyzed by using the analyzing method for distributed parameter circuits (i.e., the microwave network method). In the microwave network method, the most important parameter is the scattering parameter (the S parameter), which is a network parameter established on the basis of the relationship between an incident wave and a reflection wave and is suitable for analysis of microwave circuits. The circuit network is described by a reflected signal at a device port and a signal transmitted from the port to another port. Therefore, as can be known by people skilled in the art, the LC resonance in an equivalent circuit can be equivalently described by the S parameter. Almost all of the existing synthesizing and analyzing tools for radio frequency (RF) and microwave applications are capable of carrying out simulations by using the S parameter. An example that is the most widely used is the Advanced Design System (ADS) from the Agilent Company. Through the computer simulation carried out on the initial man-made metal microstructure by using the computer simulation software, an initial S parameter value (comprising a reflection coefficient S11 and a transmission coefficient S21) of the metamaterial attached with the initial man-made metal microstructure is obtained.

$$\begin{cases} n = \frac{1}{kd}\cos^{-1}\left[\frac{1}{2s_{21}}(1 - s_{11}^2 + s_{21}^2)\right] \\ z = \sqrt{\frac{(1+s_{11})^2 - s_{21}^2}{(1-s_{11})^2 - s_{21}^2}} \\ \varepsilon = \frac{n}{z}, \mu = nz \end{cases}$$

From this formula, the refractive index n, the impedance z, the dielectric constant $\in$ and the magnetic permeability μ of the metamaterial attached with the initial man-made metal microstructure are calculated. An objective of the present disclosure is to make the refractive index n of the metamaterial substantially equal to 1. Therefore, after the refractive index of the metamaterial attached with the initial man-made metal microstructure is obtained, the dimensions of and/or the spacings among the metal branches of the initial man-made metal microstructure must be adjusted, or even the initial man-made metal microstructure may have to be re-designed; and then the simulation calculation is carried out until a desired refractive index is obtained.

Firstly, an embodiment of the case where the 2D circuits are formed in the present disclosure will be described in detail with reference to FIG. 1 to FIG. 4.

Figure 1:
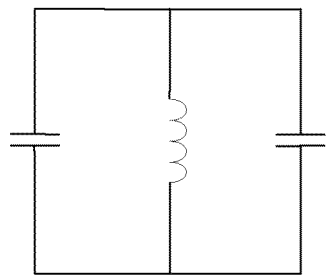
FIG. 1 is an equivalent 2D circuit diagram of an electromagnetically transparent metamaterial of the present disclosure in a direction perpendicular to an incident direction of an electromagnetic wave.
Figure 2:
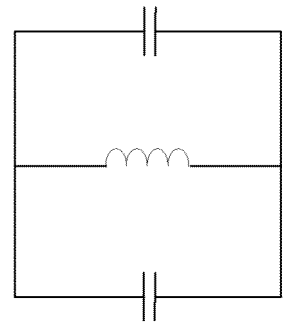
FIG. 2 is an equivalent 2D circuit diagram of the electromagnetically transparent metamaterial of the present disclosure in a direction parallel to the incident direction of the electromagnetic wave.

The design principle of forming the 2D circuits will be firstly detailed as follows. A kind of man-made metal microstructures are designed and periodically arranged inside a substrate. When an electromagnetic wave propagates through the metamaterial, each of the man-made metal microstructures is equivalent to two identical 2D circuits, which are placed in a direction perpendicular to an incident direction of the electromagnetic wave and a direction parallel to the incident direction of the electromagnetic wave, and each of which comprises an inductor branch and two identical capacitor branches that are symmetrically connected in parallel with the inductor branch, as shown in FIG. 1 and FIG. 2. The 2D circuits are associated with a waveband of the electromagnetic wave so that both a dielectric constant and a magnetic permeability of the metamaterial are substantially 1 when the electromagnetic wave propagates through the metamaterial.

By means of the aforesaid design principle and the aforesaid design process, different man-made metal microstructures satisfying requirements can be obtained. Hereinbelow, one of the man-made metal microstructures will be described in detail as an example.

Referring to FIG. 3, there is shown a schematic view illustrating an overall 3D structure of one of basic units of the electromagnetically transparent metamaterial of the present disclosure. The metamaterial comprises a plurality of man-made metal microstructures 1 and a substrate. The substrate is divided into a plurality of structural units 2, and the man-made metal microstructures 1 are attached in the plurality of structural units 2. One of the man-made metal microstructures 1 and one of the structural units 2 form a basic unit 100 of the metamaterial, and the metamaterial as a whole may be viewed as being formed by a plurality of basic units 100 arranged in an array form. The substrate may be made of any of various materials. In the present disclosure, it is required that substantially no loss shall be caused when an electromagnetic wave propagates through the metamaterial. Therefore, in order to deliver a better effect apart from obtaining a predetermined electromagnetic response of the man-made metal microstructures, the substrate may be made of various conventional materials that incur a small electromagnetic loss such as glass, FR-4, F4B, epoxy resin, polyethylene, polypropylene, rubber and PPE.

Usually, there are two methods for forming the man-made metal microstructures inside the substrate. One is to periodically arrange the overall man-made metal microstructures inside the substrate through etching, electroplating, drilling, photolithography, electron etching, or ion etching. The other method is to use sheet membranes. In the latter method, a plurality of sheet membranes have metal branches of various forms attached thereon according to the desired 3D and planar configurations of the man-made metal microstructures; and after the sheet membranes are assembled together, the metal branches of various forms attached on the sheet membranes form the desired man-made metal microstructures. Use of this method allows to conveniently adjust the sizes of and the spacings among various metal branches.

Figure 4:
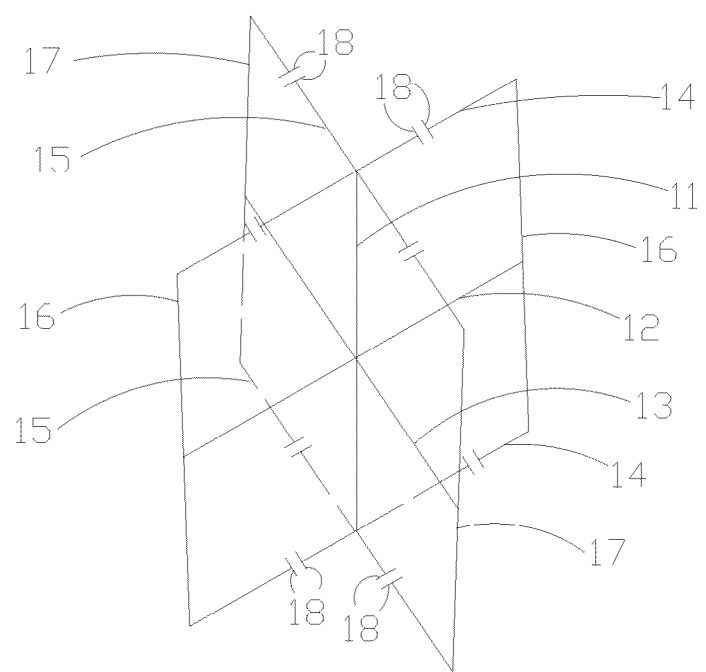
FIG. 4 is a schematic perspective view illustrating a man-made metal microstructure of the electromagnetically transparent metamaterial of the present disclosure.

Referring next to FIG. 4, there is shown a schematic perspective view illustrating a man-made metal microstructure of the electromagnetically transparent metamaterial of the present disclosure. In FIG. 4, the man-made metal microstructure comprises: a first metal branch 11, a second metal branch 12 and a third metal branch 13 intersecting with one another at a common midpoint, with the first metal branch 11 being parallel with the incident direction of the electromagnetic wave; two fourth metal branches 14 and two fifth metal branches 15, which have midpoints located at two ends of the first metal branch 11 respectively and which have the same length as and are parallel with the second metal branch 12 and the third metal branch 13 respectively; two sixth metal branches 16, which have midpoints located at two ends of the second metal branch 12 respectively and which have the same length as and are parallel with the first metal branch 11; and two seventh metal branches 17, which have midpoints located at two ends of the third metal branch 13 respectively and which have the same length as and are parallel with the first metal branch 11. The sixth metal branches 16 and the fourth metal branches 14 are positioned on a first plane of the man-made metal microstructure, and the fifth metal branches 15 and the seventh metal branches 17 are positioned on a second plane of the man-made metal microstructure. Each of the fourth metal branches 14 and each of the fifth metal branches 15 have at least one pair of notch structures disposed symmetrically with respect to their respective midpoints.

When an electromagnetic wave having an incident direction parallel to the first metal branch 11 propagates through the metamaterial, each of the metal branches is equivalent to an equivalent inductor and each of the notch structures is equivalent to an equivalent capacitor. The equivalent inductors and the equivalent capacitors form the equivalent circuits as shown in FIG. 1 and FIG. 2 in a direction parallel to the incident direction of the electromagnetic wave and a direction perpendicular to the incident direction of the electromagnetic wave respectively.

In order to increase the equivalent capacitance, each of the notch structures in this embodiment is formed by a break in each of the fourth metal branches 14 or each of the fifth metal branches 15, and two opposite eighth metal branches 18 are further disposed at each of the breaks. The eighth metal branches 18 may be of various forms and, for example, may be arc-shaped metal branches that can increase the metal line area so as to increase the capacitance; and in this embodiment, linear metal branches are adopted in order to simplify the manufacturing process of the overall man-made metal microstructure.

Additionally, in order to enlarge the application scope of the present disclosure, the first metal branch 11, the second metal branch 12 and the third metal branch 13 perpendicularly intersect with one another at the common midpoint and have a same length in this embodiment. With this design, the man-made metal microstructure in this embodiment is made symmetrical in each direction so that the electromagnetic response of the whole metamaterial is isotropic (i.e., components of the dielectric constant and the magnetic permeability of the metamaterial at each point in the space remain unchanged in each direction). Therefore, the metamaterial will present the same transparent property no matter where an electromagnetic wave having an incident direction parallel to the first metal branch 11 and having a predetermined waveband propagates through the metamaterial.

Hereinbelow, an embodiment of the case where the 3D circuit is formed in the present disclosure will be described in detail with reference to FIG. 1, FIG. 5, FIG. 6 and FIG. 7.

Figure 5:
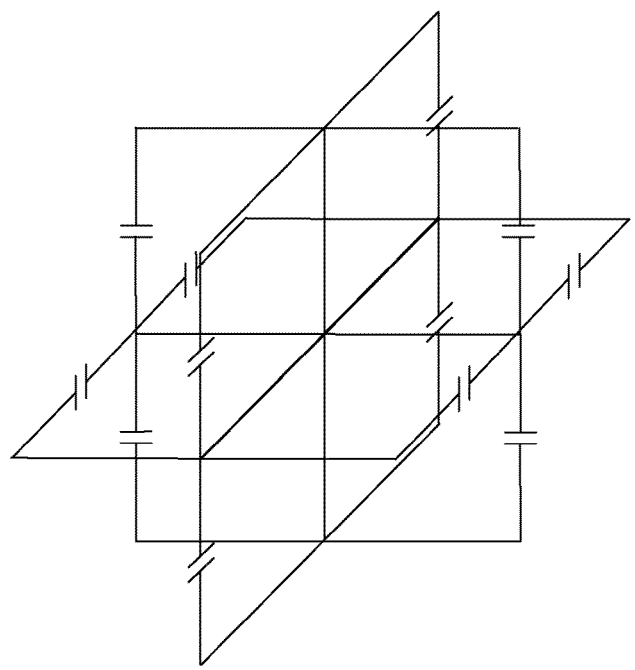
FIG. 5 is an equivalent 3D circuit diagram of the electromagnetically transparent metamaterial of the present disclosure when an electromagnetic wave of a predetermined waveband propagates through the metamaterial.

The design principle of this embodiment of the present disclosure is as follows. A kind of man-made metal microstructures are designed and periodically arranged inside a substrate. When an electromagnetic wave propagates through the metamaterial, each of the man-made metal microstructures is equivalent to a 3D circuit formed by three identical 2D circuits that are perpendicular to one another. Each of the 2D circuits comprises an inductor branch and two identical capacitor branches that are symmetrically connected in parallel with the inductor branch, as shown in FIG. 1. The three inductor branches having a common intersection point and perpendicular to one another form three axes of the 3D circuit. The 3D circuit is as shown in FIG. 5. For simplicity of depiction, equivalent inductive elements of the three inductor branches are not shown in FIG. 5, and an equivalent capacitive element of each of the capacitor branches is divided into two parts. The 3D circuit is associated with a waveband of the electromagnetic wave so that both a dielectric constant and a magnetic permeability of the metamaterial are substantially 1 when the electromagnetic wave propagates through the metamaterial.

By means of the aforesaid design principle and the aforesaid design process, different man-made metal microstructures satisfying requirements can be obtained. Hereinbelow, one of the man-made metal microstructures will be described in detail as an example.

Figure 6:
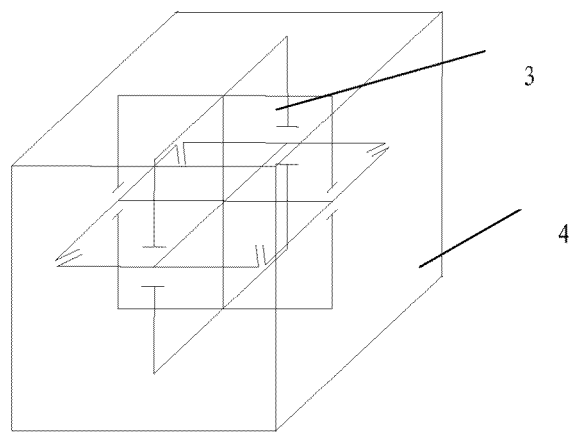
FIG. 6 is a schematic view illustrating an overall 3D structure of one of basic units of the electromagnetically transparent metamaterial of the present disclosure.

Referring to FIG. 6, there is shown a schematic view illustrating an overall 3D structure of one of basic units of the electromagnetically transparent metamaterial of the present disclosure. The metamaterial comprises a plurality of man-made metal microstructures 3 and a substrate. The substrate is divided into a plurality of structural units 4, and the man-made metal microstructures 3 are attached in the plurality of structural units 4. One of the man-made metal microstructures 3 and one of the structural units 4 form a basic unit 100 of the metamaterial, and the metamaterial as a whole may be viewed as being formed by a plurality of basic units 100 arranged in an array form. The substrate may be made of any of various materials. In the present disclosure, it is required that substantially no loss shall be caused when an electromagnetic wave propagates through the metamaterial. Therefore, in order to deliver a better effect apart from obtaining a predetermined electromagnetic response of the man-made metal microstructures, the substrate may be made of various conventional materials that incur a small electromagnetic loss such as glass, FR-4, F4B, epoxy resin, polyethylene, polypropylene, rubber and PPE.

Usually, there are two methods for forming the man-made metal microstructures inside the substrate. One is to periodically arrange the overall man-made metal microstructures inside the substrate through etching, electroplating, drilling, photolithography, electron etching, or ion etching. The other method is to use sheet membranes. In the latter method, a plurality of sheet membranes have metal branches of various forms attached thereon according to the desired 3D and planar configurations of the man-made metal microstructures; and after the sheet membranes are assembled together, the metal branches of various forms attached on the sheet membranes form the desired man-made metal microstructures. Use of this method allows to conveniently adjust the sizes of and the spacings among various metal branches, but also requires an additional process for closely connecting ends of the metal branches. In this embodiment, the man-made metal microstructures are formed by using the first method.

Figure 7:
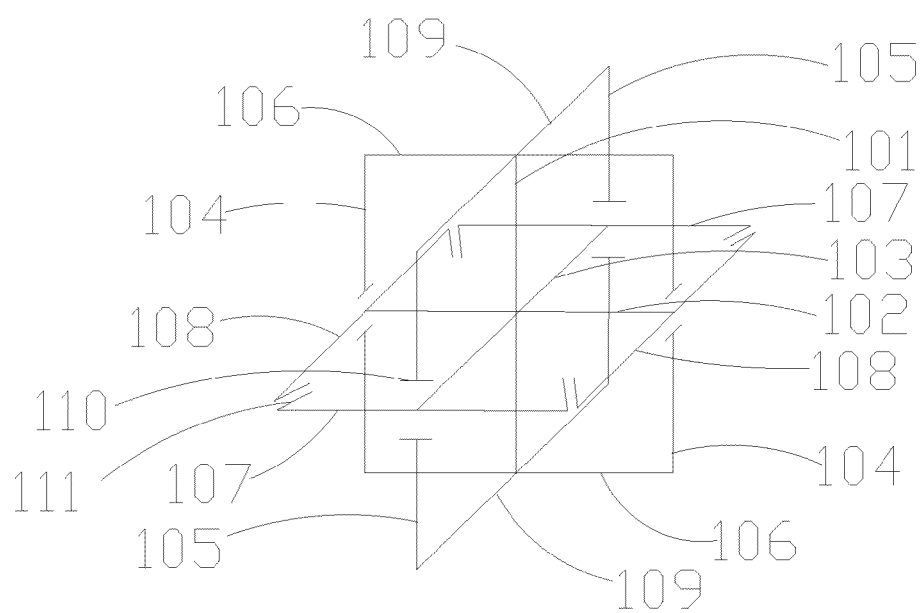
FIG. 7 is a schematic perspective view illustrating a man-made metal microstructure of the electromagnetically transparent metamaterial of the present disclosure.

Referring next to FIG. 7, there is shown a schematic perspective view illustrating a man-made metal microstructure of the electromagnetically transparent metamaterial of the present disclosure. In FIG. 7, the man-made metal microstructure comprises: a first metal branch 101, a second metal branch 102 and a third metal branch 103 intersecting with one another at a common midpoint; two fourth metal branches 104, which have midpoints located at two ends of the second metal branch 102 respectively and which have the same length as and are parallel with the first metal branch 101; two fifth metal branches 105, which have midpoints located at two ends of the third metal branch 103 respectively and which have the same length as and are parallel with the first metal branch 101; two sixth metal branches 106, which have midpoints located at two ends of the first metal branch 101 respectively and which have the same length as and are parallel with the second metal branch 102; two seventh metal branches 107, which have midpoints located at the two ends of the third metal branch 103 respectively and which have the same length as and are parallel with the second metal branch 102; two eighth metal branches 108, which have midpoints located at the two ends of the second metal branch 102 respectively and which have the same length as and are parallel with the third metal branch 103; and two ninth metal branches 109, which have midpoints located at the two ends of the first metal branch 101 respectively and which have the same length as and are parallel with the third metal branch 103. The two seventh metal branches 107 and the two eighth metal branches 108 are positioned on a first plane of the man-made metal microstructure, the two fifth metal branches 105 and the two ninth metal branches 109 are positioned on a second plane of the man-made metal microstructure, and the two fourth metal branches 104 and the two sixth metal branches 106 are positioned on a third plane of the man-made metal microstructure. Each of the seventh metal branches 107 and each of the eighth metal branches 108 have at least one pair of first notch structures disposed symmetrically with respect to their respective midpoints or each of the seventh metal branches 107 and each of the eighth metal branches 108 are formed with the first notch structure at their respective midpoints; and each of the fourth metal branches 104 and each of the fifth metal branches 105 have at least one pair of second notch structures disposed symmetrically with respect to their respective midpoints or each of the fourth metal branches 104 and each of the fifth metal branches 105 are formed with the second notch structure at their respective midpoints.

When an electromagnetic wave impinges to the metamaterial in any incident direction and propagates therethrough, each of the metal branches is equivalent to an equivalent inductor and each of the notch structures is equivalent to an equivalent capacitor. The equivalent inductors and the equivalent capacitors form the equivalent circuit as shown in FIG. 5.

In order to increase the equivalent capacitance, each of the second notch structures is formed by a break at the midpoint of each of the fourth metal branches 104 or each of the fifth metal branches 105, and tenth opposite metal branches 110 are further disposed at each of the breaks in this embodiment. In FIG. 7, only one of the tenth metal branches 110 is labeled for purpose of simplicity. In this embodiment, each of the first notch structures is formed by interruptions between ends of each of the seventh metal branches 107 and of each of the eighth metal branches 108; and at both ends of each of the seventh metal branches 107 and of each of the eighth metal branches 108, two eleventh metal branches 111 that extend towards the inside of the substrate and form a same angle respect to the seventh metal branch 107 and the eighth metal branch 108 respectively are disposed. In FIG. 7, only one of the eleventh metal branches 111 is labeled for purpose of simplicity.

Conceivably, provided that the objective of the present disclosure can be achieved, the first notch structures may be at least one pair of breaks disposed on each of the fourth metal branches 104 and each of the fifth metal branches 105 symmetrically with respect to their respective midpoints, or may be the same as the second notch structures; and the second notch structures may be at least one pair of breaks disposed on each of the seventh metal branches 107 and each of the eighth metal branches 108 symmetrically with respect to their respective midpoints, or may be the same as the first notch structures. Meanwhile, the tenth metal branches 110 and the eleventh metal branches 111 may be of any of various forms and, for example, may be arc-shaped metal branches that can increase the metal line area so as to increase the capacitance; and in this embodiment, linear metal branches are adopted in order to simplify the manufacturing process of the overall man-made metal microstructure.

Additionally, in order to enlarge the application scope of the present disclosure, the first metal branch 101, the second metal branch 102 and the third metal branch 103 perpendicularly intersect with one another at the common midpoint and have a same length in this embodiment. With this design, the man-made metal microstructure in this embodiment is made symmetrical in each direction so that the electromagnetic response of the whole metamaterial is isotropic (i.e., components of the dielectric constant and the magnetic permeability of the metamaterial at each point in the space remain unchanged in each direction). Moreover, the man-made metal microstructure of the present disclosure can be equivalent to an LC resonant circuit in each of the three planes, and the LC resonant circuits can produce resonant responses to an electromagnetic field in any incident direction. Therefore, the metamaterial will present the same transparent property no matter where an electromagnetic wave of any waveband other than the resonant wavebands of the LC resonant circuits propagates through the metamaterial.

What described above are just embodiments of the present disclosure. It shall be appreciated that, many improvements and modifications may be made by those of ordinary skill in the art without departing from the principle of the present disclosure, and these improvements and modifications shall also fall within the scope of the present disclosure.

What is claimed is:

1. An electromagnetically transparent metamaterial, comprising a substrate and a plurality of man-made metal microstructures arranged periodically inside the substrate, wherein each of the man-made metal microstructures is equivalent to a three-dimensional (3D) circuit formed by three identical 2D circuits that are perpendicular to one another at a common midpoint, each of the 2D circuits comprises an inductor branch and two identical capacitor branches that are symmetrically connected in parallel with the inductor branch, the three inductor branches having a common intersection point and perpendicular to one another form three axes of the 3D circuit, and the 3D circuit is associated with a waveband so that both a dielectric constant and a magnetic permeability of the metamaterial are substantially 1 within the waveband, wherein each of the man-made metal microstructures comprises: a first metal branch, a second metal branch and a third metal branch intersecting with one another at a common midpoint; two fourth metal branches, which have midpoints located at two ends of the second metal branch respectively and which have the same length as and are parallel with the first metal branch; two fifth metal branches, which have midpoints located at two ends of the third metal branch respectively and which have the same length as and are parallel with the first metal branch; two sixth metal branches, which have midpoints located at two ends of the first metal branch respectively and which have the same length as and are parallel with the second metal branch; two seventh metal branches, which have midpoints located at the two ends of the third metal branch respectively and which have the same length as and are parallel with the second metal branch; two eighth metal branches, which have midpoints located at the two ends of the second metal branch respectively and which have the same length as and are parallel with the third metal branch; and two ninth metal branches, which have midpoints located at the two ends of the first metal branch respectively and which have the same length as and are parallel with the third metal branch, the two seventh metal branches and the two eighth metal branches are positioned on a first plane of the man-made metal microstructure, the two fifth metal branches and the two ninth metal branches are positioned on a second plane of the man-made metal microstructure, the two fourth metal branches and the two sixth metal branches are positioned on a third plane of the man-made metal microstructure, each of the seventh metal branches and each of the eighth metal branches have at least one pair of first notch structures disposed symmetrically with respect to their respective midpoints or each of the seventh metal branches and each of the eighth metal branches are formed with the first notch structure at their respective midpoints; and each of the fourth metal branches and each of the fifth metal branches have at least one pair of second notch structures disposed symmetrically with respect to their respective midpoints or each of the fourth metal branches and each of the fifth metal branches are formed with the second notch structure at their respective midpoints.

2. The electromagnetically transparent metamaterial of claim 1, wherein each of the first notch structures is formed by interruptions between ends of each of the seventh metal branches and of each of the eighth metal branches.

3. The electromagnetically transparent metamaterial of claim 2, wherein at both ends of each of the seventh metal branches and of each of the eighth metal branches, eleventh metal branches that extend towards the inside of the substrate and form a same angle respect to the corresponding seventh metal branch and eighth metal branch are disposed.

4. The electromagnetically transparent metamaterial of claim 1, wherein each of the second notch structures is formed by a break at the midpoint of each of the fourth metal branches or of each of the fifth metal branches.

5. The electromagnetically transparent metamaterial of claim 4, wherein two opposite tenth metal branches are further connected at two ends of the break respectively.

6. The electromagnetically transparent metamaterial of claim 3, wherein the tenth metal branches and the eleventh metal branches are linear metal branches or arc-shaped metal branches.

7. The electromagnetically transparent metamaterial of claim 5, wherein the tenth metal branches and the eleventh metal branches are linear metal branches or arc-shaped metal branches.

8. The electromagnetically transparent metamaterial of claim 1, wherein the first metal branch, the second metal branch and the third metal branch perpendicularly intersect with one another at the common midpoint and have a same length.

9. The electromagnetically transparent metamaterial of claim 1, wherein the substrate is made of one or more of glass, FR-4, F4B, epoxy resin, polyethylene, polypropylene, rubber and PPE.

10. The electromagnetically transparent metamaterial of claim 1, wherein the man-made metal microstructure is attached on the substrate through etching, electroplating, drilling, photolithography, electron etching, or ion etching.

* * * * *

UNITED STATES PATENT AND TRADEMARK OFFICE
CERTIFICATE OF CORRECTION

| | | |
|---|---|---|
| PATENT NO. | : 9,178,284 B2 | Page 1 of 1 |
| APPLICATION NO. | : 13/522954 | |
| DATED | : November 3, 2015 | |
| INVENTOR(S) | : Ruopeng Liu et al. | |

It is certified that error appears in the above-identified patent and that said Letters Patent is hereby corrected as shown below:

On the title page, item (73), correct the name of the 1st assignee from "KUSNG-CHI INNOVATIVE TECHNOLOGY LTD." to --KUANG-CHI INNOVATIVE TECHNOLOGY LTD.--.

Signed and Sealed this
Twenty-third Day of February, 2016

Michelle K. Lee
*Director of the United States Patent and Trademark Office*